(12) United States Patent
Kim (10) Patent No.: US 9,965,265 B2
(45) Date of Patent: May 8, 2018

(54) MANAGEMENT SYSTEM FOR PROTECTIVE FILMS FOR SMART TERMINALS

(71) Applicant: Yong Seok Kim, Gwangju-si (KR)

(72) Inventor: Yong Seok Kim, Gwangju-si (KR)

( * ) Notice: Subject to any disclaimer, the term of this patent is extended or adjusted under 35 U.S.C. 154(b) by 0 days. days.

(21) Appl. No.: 15/113,347

(22) PCT Filed: Jan. 21, 2015

(86) PCT No.: PCT/KR2015/000635
§ 371 (c)(1),
(2) Date: Jul. 21, 2016

(87) PCT Pub. No.: WO2015/111918
PCT Pub. Date: Jul. 30, 2015

(65) Prior Publication Data
US 2017/0003946 A1    Jan. 5, 2017

(30) Foreign Application Priority Data

Jan. 23, 2014   (KR) ........................ 10-2014-0008141

(51) Int. Cl.
*G06F 8/61* (2018.01)
*G06F 1/16* (2006.01)
*G06F 9/445* (2018.01)
*G06Q 30/06* (2012.01)
*G06K 7/14* (2006.01)

(52) U.S. Cl.
CPC .............. *G06F 8/61* (2013.01); *G06F 1/1637* (2013.01); *G06K 7/1417* (2013.01); *G06Q 30/06* (2013.01)

(58) Field of Classification Search
CPC ....... G06F 8/61; G06F 1/1637; G06K 7/1417; G06Q 30/06
See application file for complete search history.

(56) References Cited

U.S. PATENT DOCUMENTS 6,009,338 A * 12/1999 Iwata .................. H04M 1/0214
                                                         379/433.04
7,327,255 B2 * 2/2008 Kassiedass ............ A45C 13/24
                                                         340/309.8

(Continued)

OTHER PUBLICATIONS

Rouillard, "Contextual QR Codes," 2008, IEEE, Third International Multi-Conference on Computing in the Global Information Technology, pp. 50-55, downloaded from the Internet on Feb. 14, 2018 at <url>:http://ieeexplore.ieee.org.*

(Continued)

*Primary Examiner* — Thuy Dao
*Assistant Examiner* — Stephen Berman
(74) *Attorney, Agent, or Firm* — Novick, Kim & Lee, PLLC; Jae Youn Kim (57) ABSTRACT

The present invention relates to a management system for protective films for smart terminals, which is capable of managing a sales status of the protective films by assigning serial numbers to the protective films for the smart terminals and registering the serial numbers. The present invention has the effects of relieving the inconvenience of a seller having to record everything individually, and also maximizing the efficiency of sales management by automatically storing the serial numbers by linking the serial numbers to smart terminal information.

9 Claims, 4 Drawing Sheets

(56) References Cited

U.S. PATENT DOCUMENTS

| | | | | |
|---|---|---|---|---|
| 8,936,194 | B1* | 1/2015 | Welch | G06K 7/1417 |
| | | | | 235/435 |
| 9,390,253 | B2* | 7/2016 | Hansen | H04W 12/06 |
| 2003/0028629 | A1* | 2/2003 | Amro | G06F 8/60 |
| | | | | 709/222 |
| 2005/0005102 | A1* | 1/2005 | Meggitt | G06F 8/63 |
| | | | | 713/164 |
| 2005/0038872 | A1* | 2/2005 | Ono | G06K 7/10722 |
| | | | | 709/218 |
| 2005/0149759 | A1* | 7/2005 | Vishwanath | G06F 21/34 |
| | | | | 726/4 |
| 2005/0149951 | A1* | 7/2005 | Uola | G06F 8/60 |
| | | | | 719/328 |
| 2007/0008118 | A1* | 1/2007 | Kassiedass | A45C 13/24 |
| | | | | 340/539.21 |
| 2008/0311706 | A1* | 12/2008 | Dozen | H01L 23/293 |
| | | | | 438/127 |
| 2010/0257224 | A1* | 10/2010 | Tobita | G06F 8/61 |
| | | | | 709/202 |
| 2013/0272557 | A1* | 10/2013 | Ozcan | G06F 1/1637 |
| | | | | 381/333 |
| 2014/0025519 | A1* | 1/2014 | Thomas | G06F 8/61 |
| | | | | 705/21 |
| 2014/0181801 | A1* | 6/2014 | Voronkov | G06F 8/61 |
| | | | | 717/177 |
| 2014/0195826 | A1* | 7/2014 | Wojcik | H05K 5/0086 |
| | | | | 713/300 |
| 2014/0273966 | A1* | 9/2014 | Hansen | H04W 12/06 |
| | | | | 455/411 |
| 2014/0295814 | A1* | 10/2014 | Heo | H04W 4/005 |
| | | | | 455/418 |

OTHER PUBLICATIONS

Liu et al., "Recognition of QR Code with mobile phones," 2008, IEEE, Chinese Control and Decision Conference, pp. 203-206, downloaded from the Internet on Feb. 14, 2018 at <url>:http://ieeexplore.ieee.org.*

Ilie-Zudor et al., "A survey of applications and requirements of unique identification systems and RFID techniques," 2011, Computers in Industry, vol. 62, Issue 3, downloaded from the Internet on Feb. 14, 2018 at <url>:www.sciencedirect.com.*

* cited by examiner

MANAGEMENT SYSTEM FOR PROTECTIVE FILMS FOR SMART TERMINALS

TECHNICAL FIELD

The present invention relates to a protective film management system used in a smart terminal and, more particularly, to a protective film management system used in a smart terminal, for managing a sales status of protective films by assigning serial numbers to the protective films and registering the serial numbers.

BACKGROUND ART

Generally, smart terminals including a cellular phone, a smart pad, and a tablet PC are equipped with a display comprised of a liquid crystal display (LCD) panel, the display being exposed.

Due to characteristics of the panel or according to use states by a user, the display is liable to become dirty or be smudged by fingerprints, ambient dust (e.g., greasy marks), or undesired shocks.

To protect the display from an external environment and use the display in a pleasant state, users who use smart terminals including cellular phones attach protective films made of various types of transparent synthetic resins to displays of the smart terminals. The protective films have been sold at a high cost as functions thereof are improved but after service (A/S) therefor has been provided free of charge.

However, in this case, since a seller of the protective films cannot verify whether a protective film used by a user is a protective film sold thereby and there are many reproduction films in the case of an expensive film, the seller should record a sales status in detail.

In addition, if a sold protective film has defects, the seller needs to provide A/S free of charge and, if a buyer of a defective protective film requests exchange, the seller should exchange the protective film. Then, the seller checks sales status information listed in a sales process to verify whether the A/S requested protective film or the exchange requested protective film is a protective film sold thereby. However, this process is very inconvenient.

DETAILED DESCRIPTION OF THE INVENTION

Technical Problems

The present invention has been made in view of the above problems, and it is an object of the present invention to provide a protective film management system used in a smart terminal, for managing a sales status of protective films by assigning serial numbers to the protective films and registering the serial numbers.

It is another object of the present invention to provide a protective film management system used in a smart terminal, for preventing illegal reproduction of protective films by assigning serial numbers capable of uniquely identifying sold protective films.

It is still another object of the present invention to provide a protective film management system used in a smart terminal, for installing a storage medium for providing information stored in a radio frequency identification (RFID) tag manner on one end surface of a protective film and transmitting the information stored in the storage medium to a protective film management server through a protective film management application by executing the protective film management application in the case in which the protective film approaches a screen of the smart terminal.

It is a further object of the present invention to provide a protective film management system used in a smart terminal, for checking whether a protective film management application is installed in the smart terminal when a protective film including a storage medium for providing information stored in an RFID tag manner approaches a screen of the smart terminal and providing a screen for installing the protective film management application when the protective film management application is not installed.

Technical Solutions

According to an aspect of the present invention, provided herein is a protective film management system including a protective film including identification (ID) information and an attachment guide indicator, and a protective film management server configured to provide a protective film management application to a smart terminal in response to an installation request signal of the protective film management application so that the smart terminal downloads and installs the protective film management application, to receive a result of matching the ID information of the protective film with ID information of the smart terminal through the protective film management application, and to generate and manage protective film sales information.

The ID information of the protective film may be a serial number.

The protective film management server may compare the ID information of the protective film with preregistered ID information of the protective film upon receiving the ID information assigned to the protective film from the smart terminal and may output a message indicating that the protective film is a reproduced film to the smart terminal when the same ID information is present, and the ID information of the protective film may be a serial number.

The protective film may further include a quick response (QR) code for providing information capable of executing the protective film management application, and, if the QR code is read by the smart terminal, the smart terminal may execute the protective film management application to cause a user to input the ID information of the protective film when the protective film management application is installed in the smart terminal and online-access the protective film management server when the protective film management application is not installed in the smart terminal.

The protective film may further include a storage medium configured to store the ID information of the protective film and installation information of the protective film management application and to transmit the stored ID information and installation information of the protective film management application according to a proximity communication scheme, and, if the protective film approaches the smart terminal, the smart terminal may receive the ID information and the installation information of the protective film management application from the storage medium, output an installation guide message of the protective film management application on a screen, receive the protective film management application from the protective film management server upon inputting the installation request signal of the protective film management application according to manipulation by a user, and install the protective film management application.

The smart terminal may confirm whether the protective film is normally attached to the smart terminal in a screen setup state and transmit the ID information of the protective film to the protective film management server when the protective film has been attached to the smart terminal.

If the attached protective film is removed from the smart terminal, the smart terminal may recognize removal of the protective film, generate protective film removal information, and transmit the protective film removal information to the protective film management server.

The storage medium may be implemented as a sticker and may be attached to one side of a release paper of the protective film.

The storage medium may be provided in a printed form at one side of an outer end of a main film of the protective film.

If the ID information of the protective film to which the removal information is linked is received, the protective film management server may output an announcement message indicating that the protective film has been removed from the smart terminal on the screen of the smart terminal.

If after service (A/S) is performed on a sold protective film, the protective film management server may cause A/S information to be input, receive a result of matching the ID information of the protective film 100 for which A/S is provided with the A/S information, and manage the A/S information.

The protective film management server may transmit the A/S information to a protective film manufacturer server.

Advantageous Effects

According to the present invention, a protective film management system can manage a sales status of protective films by assigning serial numbers to protective films used in a smart terminal. Therefore, inconvenience caused by recording of sold protective films one by one by a seller n can be solved and efficiency of sales management can be maximized by automatically recording the serial numbers through linkage with information about the smart terminal.

According to the present invention, the protective film management system assigns serial numbers capable of identifying sold protective films and, if the same serial number as an input serial number is present, outputs a message indicating an illegally reproduced protective film through a smart terminal, thereby preventing illegal reproduction of the protective films.

According to the present invention, the protective film management system includes a storage medium for providing information stored in an RFID tag manner on one end surface of a protective film and transmits the information stored in the storage medium to a protective film management server through a protective film management application by executing the protective film management application in the case in which the protective film approaches a screen of a smart terminal, thereby automatically transmitting the information stored in the storage medium to the protective film management server without additional work by a seller or a buyer and managing protective films.

According to the present invention, if a protective film including a storage medium for providing information stored in an RFID tag manner approaches a screen of a smart terminal, the protective film management system checks whether a protective film management application is installed in the smart terminal and, if the protective film management application is not installed, the protective film management system provides a screen for installing the protective film management application, thereby causing a seller or a buyer not to perform additional work for installing the protective film management application in the smart terminal and thus providing convenience.

BEST MODE FOR CARRYING OUT THE INVENTION

Technical terms used in this specification are used merely to illustrate specific embodiments, and it should be understood that they are not intended to limit the present disclosure. So long as not defined otherwise, all terms used herein including technical terms may have the same meaning as those generally understood by an ordinary person skilled in the art to which the present disclosure belongs, and should not be construed in an excessively comprehensive manner or an extremely restricted manner. In addition, if a technical term used in the description of the present disclosure is an erroneous term that fails to clearly express the idea of the present disclosure, it should be replaced by a technical term that can be properly understood by those skilled in the art. In addition, general terms used in the description of the present disclosure should be construed according to definitions in dictionaries or according to context, and should not be construed in an excessively restrained manner.

A singular representation used herein may include a plural representation unless the context clearly indicates otherwise. It will be understood that the terms "comprise", "include", etc., when used in this specification, specify the presence of several components or several steps and part of the components or steps may not be included or additional components or steps may be further included.

Hereinafter, exemplary embodiments of the present invention will be described in detail with reference to the accompanying drawings. In the drawings, the same or similar elements are denoted by the same reference numerals even though they are depicted in different drawings and a repetitive description thereof will be omitted.

In the following description of the present invention, a detailed description of known functions and configurations incorporated herein will be omitted when it may obscure the subject matter of the present invention. Further, it should be noted that the accompanying drawings are merely illustrated to easily explain the spirit of the invention and, therefore, should not be construed as limiting the spirit of the invention by the accompanying drawings.

Figure 1:
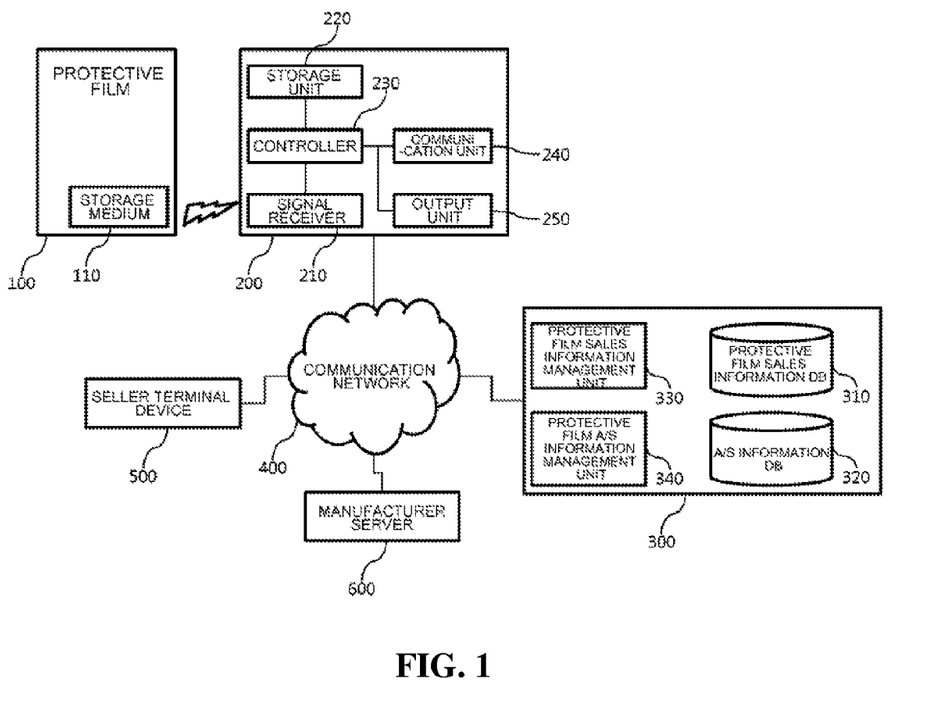
FIG. 1 is a diagram illustrating the construction of a protective film management system used in a smart terminal according to the present invention.

FIG. 1 is a diagram illustrating the construction of a protective film management system used in a smart terminal according to the present invention.

As illustrated in FIG. 1, the protective film management system used in a smart terminal includes a protective film 100, a smart terminal 200, a protective film management server 300, and a communication network 400 for providing a communication environment to transmit and receive data between the smart terminal 200 and the protective film management server 300.

The protective film 100 includes identification (ID) information and an attachment guide indicator.

The smart terminal 200 includes a signal receiver 210 for receiving a signal transmitted by a proximity communication scheme, a storage unit 220 for storing an operation program and plural data, a controller 230 for controlling all constituent elements according to the operation program stored in the storage unit 220, a communication unit 240 for transmitting a signal over the communication network 400 under control of the controller 230, and an output unit 250 for outing various information on a screen under control of the controller 230. The controller 230 of the smart terminal 200 transmits an access request signal to the protective film management server 300, input by manipulation of an input unit (not shown) by a user, or an application installation request signal for managing the protective film, received from the signal receiver 210, to the protective film management server 300 through the communication unit 240. Next, the controller 230 of the smart terminal 200 downloads a protective film management application from the protective film management server 300 and installs the protective film management application. All of the above situations are output through the output unit 250 so that a user can confirm the situations. In this way, if the protective film management application is installed in the smart terminal 200, when the user newly attaches a protective film to the smart terminal 200 or the user removes an old protective film and attaches a new protective film to the smart terminal 200, the protective film ID information is manually or automatically matched with ID information of the smart terminal 200 and a matched result is transmitted to the protective film management server 300.

The protective film management server 300 allows the smart terminal 200 to download and install the protective film management application in response to the protective film management application installation request signal and generates and manages protective film sales information by receiving the result of matching the ID information of the protective film with the ID information of the smart terminal 200.

Upon receiving a serial number, which is the ID information assigned to the protective film 100, from the smart terminal 200, the protective film management server 300 compares the ID information assigned to the protective film 100 with preregistered ID information of the protective film 100 and, if the same ID information is present as a comparison result, the protective film management server 300 generates a message indicating that the protective film 100 is a reproduced protective film. Thus, both a protective film seller and a protective film buyer are easily aware of whether the protective film 100 which is sold or purchased is an original protective film or a reproduced protective film. Therefore, the protective film 100 can be prevented from being reproduced.

Figure 2:
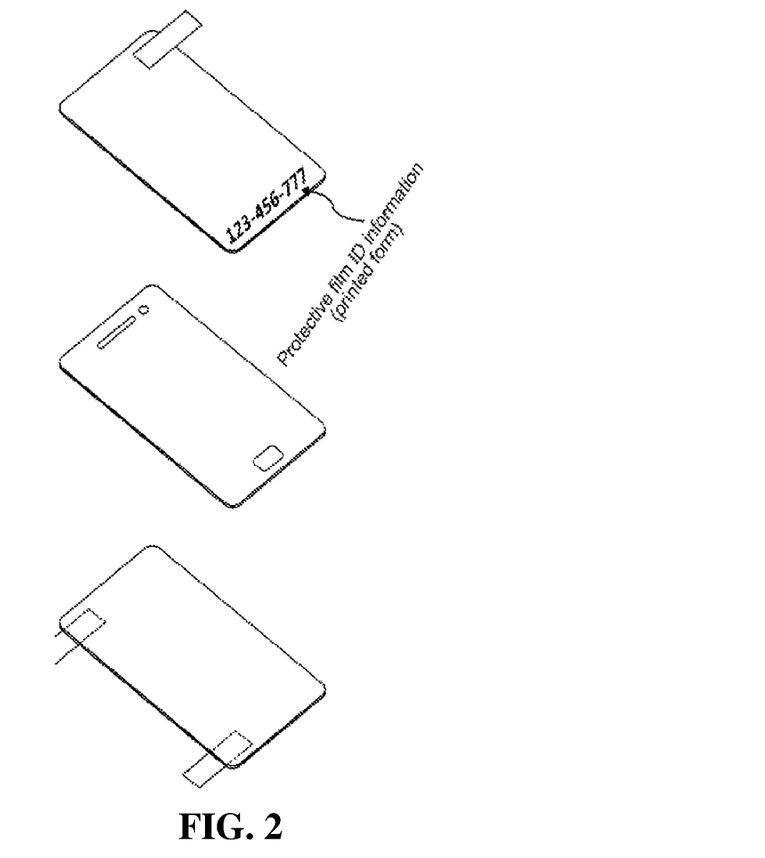
FIG. 2 is a diagram illustrating a protective film including a release paper on which protective film ID information is printed according to the present invention.

The ID information of the protective film 100 is a serial number and may include manufacturer information, manufacture data information, and sales related information in addition to the serial number. In this case, the serial number may be provided by being printed on a release paper 101 constituting the protective film 100 (refer to FIG. 2).

The protective film 100 may further include a quick response (QR) code that provides information capable of executing the protective film management application. If the QR code is read through the smart terminal 200, the smart terminal 200 executes the protective film management application to cause a user to input the ID information of the protective film when the protective film management application is installed in the smart terminal 200 and online-accesses the protective film management server 300 when the protective film management application is not installed in the smart terminal 200.

The protective film 100 further includes a storage medium 110 for storing the ID information and installation information of the protective film management application and transmitting the ID information and the installation information of the protective film management application according to a proximity communication scheme. If the protective film approaches the smart terminal 200, the smart terminal 200 receives the ID information and the installation information of the protective film management application from the storage medium 110 and outputs an installation guide message of the protective film management application on a screen. If the installation request signal of the protective film management application is input by manipulation by a user, the smart terminal 200 receives the protective film management application from the protective film management server 300 and installs the protective film management application.

The smart terminal 200 checks whether the protective film is normally attached thereto in a screen setup state and, if so, the smart terminal 200 transmits the protective film ID information to the protective film management server 300.

If the attached protective film 100 is removed from the smart terminal 200, the smart terminal 200 recognizes this, generates protective film removal information, and transmits the protective film removal information to the protective film management server 300.

Figure 3:
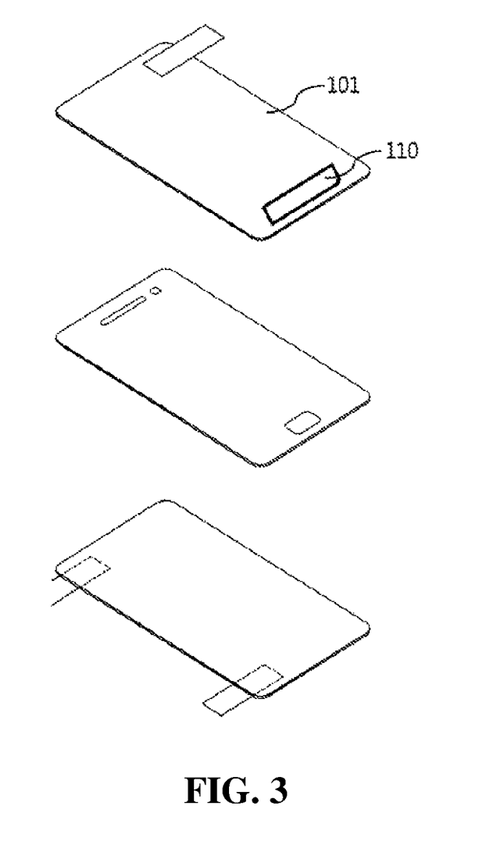
FIG. 3 is a diagram illustrating a protective film including a release paper to which a storage medium is attached in a sticker form according to the present invention.

The storage medium 110 may be implemented as a sticker and may be provided by being attached to one side of the release paper 101 in the protective film 100 (refer to FIG. 3).

Figure 4:
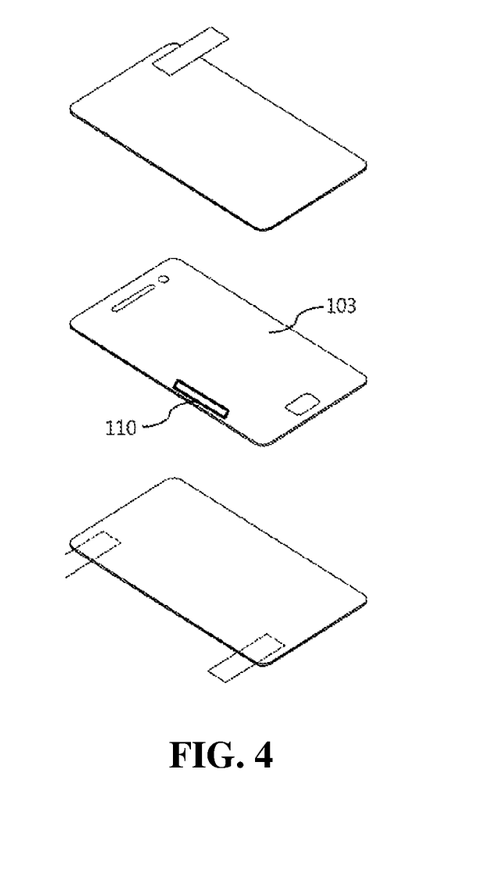
FIG. 4 is a diagram illustrating a protective film including a main film to which a storage medium is provided in a printed form according to the present invention.

The storage medium 110 may be provided in a printed form at one side of an outer end of a main film 103 of the protective film (refer to FIG. 4.

Upon receiving the protective film ID information to which the removal information is linked, the protective film management server 300 causes the smart terminal 200 to output an announcement message indicating that the protective film has been removed from the smart terminal 200 on a screen.

If A/S for the sold protective film 100 is performed, the protective film management server 300 causes A/S information to be input, receives a result of matching the ID information of the protective film 100 for which A/S is provided with the A/S information, and manages the A/S information.

The protective film management server 300 transmits the A/S information to a protective film manufacturer server 600.

A method of managing the protective film used in the smart terminal described above will be described in detail with reference to the attached drawings.

<Case in which Protective Film Management Application is not Installed>

1. Manual Installation

FIG. 3 is a flowchart illustrating a method of managing a protective film used in a smart terminal according to the present invention.

A method of managing a protective film used in a smart terminal will now be described with reference to FIG. 3. The smart terminal 200 online-accesses the protective film management server 300 according to manipulation thereof by a user and downloads and then installs the protective film management application.

If the protective film management application is executed according to manipulation of the smart terminal 200 by the user, the smart terminal 200 outputs a protective film ID information input request screen through the output unit 250.

If protective film ID information is input through the protective film ID information input request screen, the smart terminal 200 matches the protective film ID information with ID information of the smart terminal 200 and transmits a matched result to the protective film management server 300. Then, the protective film management application outputs a protective film attachment guide indicator on the screen of the smart terminal 200. The user attaches the protective film to the smart terminal 200 by matching an indicator indicated in the protective film with the indicator displayed on the screen.

2. Automatic Installation

If the protective film 100 including the storage medium 110 capable of transmitting information approaches the screen of the smart terminal 200 which has been turned on by a proximity wireless communication scheme according to manipulation by a user, the storage medium 110 and the signal receiver 210 of the smart terminal 200 perform communication so that the protective film ID information stored in the storage medium 110 and automatic installation information of the protective film management application are input to the controller 230 through the signal receiver 210 of the smart terminal 200.

Then, the controller 230 analyzes the automatic installation information of the protective film management application, online-accesses the protective film management server 300, automatically downloads, installs, and executes the protective film management application, and transmits the protective film ID information to the protective film management server 300 through the protective film management application.

<Case in which Protective Film Management Application is Installed>

1. Manual Input

If the protective film management application is installed in the smart terminal 200 and a serial number is written in the protective film 100, a user executes the protective film management application prior to attaching the protective film to the front surface of the smart terminal 200 and then inputs the serial number together with user information (information of the smart terminal).

2. Automatic Input

If the protective film 100 including the storage medium 110 that transmits a signal by a proximity wireless scheme approaches the screen of the smart terminal 200 in which the protective film management application is installed, a protective film management application execution request signal and protective film ID information stored in the storage medium 110 are transmitted by a proximity wireless scheme and the signal receiver 210 of the smart terminal 200 receives the above signals and outputs the signals to the controller 230. The controller 230 executes the protective film management application stored in the storage 220, matches the protective film ID information with the ID information of the smart terminal through the protective film management application, and transmits the matched result to the protective film management server 300.

<Protective Film ID Information Management Mode>

A protective film sales information management unit 330 of the protective film management server 300 receives the protective film ID information input from the smart terminal 200, stores the protective film ID information in a protective film sales information database (DB) 310 as protective film sales information, and manages the protective film ID information. Upon receiving the protective film ID information from the smart terminal 200, the protective film sales information management unit 330 determines whether the received protective film ID information has been registered in the protective film sales information DB 310, and if the protective film ID information has been registered, provides a message indicating that a corresponding protective film is not a genuine product to be displayed on the screen of the smart terminal 200.

Meanwhile, if the protective film has a defect or problem, the user may request that a seller perform A/S. Then, the seller online-accesses the protective film management server 300 by manipulating a seller terminal device 500, inputs the protective film ID information provided to user for A/S and A/S related information, and provides A/S for the protective film to the user.

The protective film ID information and the A/S related information provided for A/S are stored in an A/S information DB 320 through a protective film A/S information management unit 340. The protective film management server 300 statistically processes the protective film sales information and the A/S information registered in the protective film sales information DB 310 and the A/S information DB 320 and transmits the statistically processed data to a manufacturer server 600, so that a manufacturer may use the data for manufacturing protective films and for marketing.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention relates to a protective film management system used in a smart terminal and, more particularly, to a protective film management system used in a smart terminal, for managing a sales status of protective films by assigning serial numbers to the protective films and registering the serial numbers.

The invention claimed is:

1. A protective film management system, comprising:
a protective film including identification (ID) information and an attachment guide indicator and configured to protect a display screen of a smart terminal; and
a protective film management server, stored in a memory, configured to provide a protective film management application to the smart terminal in response to an installation request signal of the protective film management application so that the smart terminal downloads and installs the protective film management application, to receive a result of comparing the ID information of the protective film with ID information of the smart terminal through the protective film management application, and to generate and manage sales information of the protective film, wherein the protective film further includes a storage medium configured to store the ID information of the protective film and installation information of the protective film management application and to transmit the stored ID information and installation information of the protective film management application according to a proximity communication scheme, wherein, if the protective film approaches the smart terminal, the smart terminal receives the ID information and the installation information of the protective film management application from the storage medium, outputs an installation guide message of the protective film management application on the screen of the smart terminal, receives the protective film management application from the protective film management server upon inputting the installation request signal of the protective film management application according to manipulation by a user, and installs the protective film management application, wherein, if the ID information of the protective film is input through an input request screen of the smart terminal, the smart terminal compares the ID information of the protective film with the ID information of the smart terminal and transmits the result of comparing the ID information of the protective film with the ID information of the smart terminal to the protective film management server, wherein, if the ID information of the protective film is matched with the ID information of the smart terminal, the smart terminal outputs the attachment guide indicator of the protective film on the screen of the smart terminal through the protective film management application, thereby enabling the user to attach the protective film to the smart terminal by matching an indicator indicated in the protective film with the attachment guide indicator displayed on the screen, wherein the protective film management server compares the ID information of the protective film with preregistered ID information of the protective film upon receiving the ID information assigned to the protective film from the smart terminal and outputs a message indicating that the protective film is a reproduced film to the smart terminal when the same ID information is present, wherein the protective film further includes a quick response (OR) code for providing information capable of executing the protective film management application, wherein, if the OR code is read by the smart terminal, the smart terminal executes the protective film management application to cause a user to input the ID information of the protective film when the protective film management application is installed in the smart terminal, and wherein, if after service (A/S) is to be performed on a sold protective film, the protective film management server causes A/S information to be input, receives a result of comparing the ID information of the protective film for which A/S is provided with the A/S information, and manages the A/S information.

2. The protective film management system according to claim 1, wherein the ID information of the protective film is a serial number.

3. The protective film management system according to claim 1, wherein the smart terminal online-accesses the protective film management server when the protective film management application is not installed in the smart terminal.

4. The protective film management system according to claim 1, wherein the smart terminal confirms whether the protective film is correctly attached to the smart terminal in a screen setup state and transmits the ID information of the protective film to the protective film management server when the protective film has been attached to the smart terminal.

5. The protective film management system according to claim 1, wherein, if the attached protective film is removed from the smart terminal, the smart terminal recognizes removal of the protective film, generates protective film removal information, and transmits the protective film removal information to the protective film management server.

6. The protective film management system according to claim 1, wherein the storage medium is implemented as a sticker and is attached to one side of a release paper of the protective film.

7. The protective film management system according to claim 1, wherein the storage medium is provided in a printed form at one side of an outer end of a main film of the protective film.

8. The protective film management system according to claim 5, wherein, if the ID information of the protective film to which the removal information is linked is received, the protective film management server outputs an announcement message indicating that the protective film has been removed from the smart terminal on the screen of the smart terminal.

9. The protective film management system according to claim 1, wherein the protective film management server transmits the A/S information to a protective film manufacturer server.

* * * * *